Figure 1:
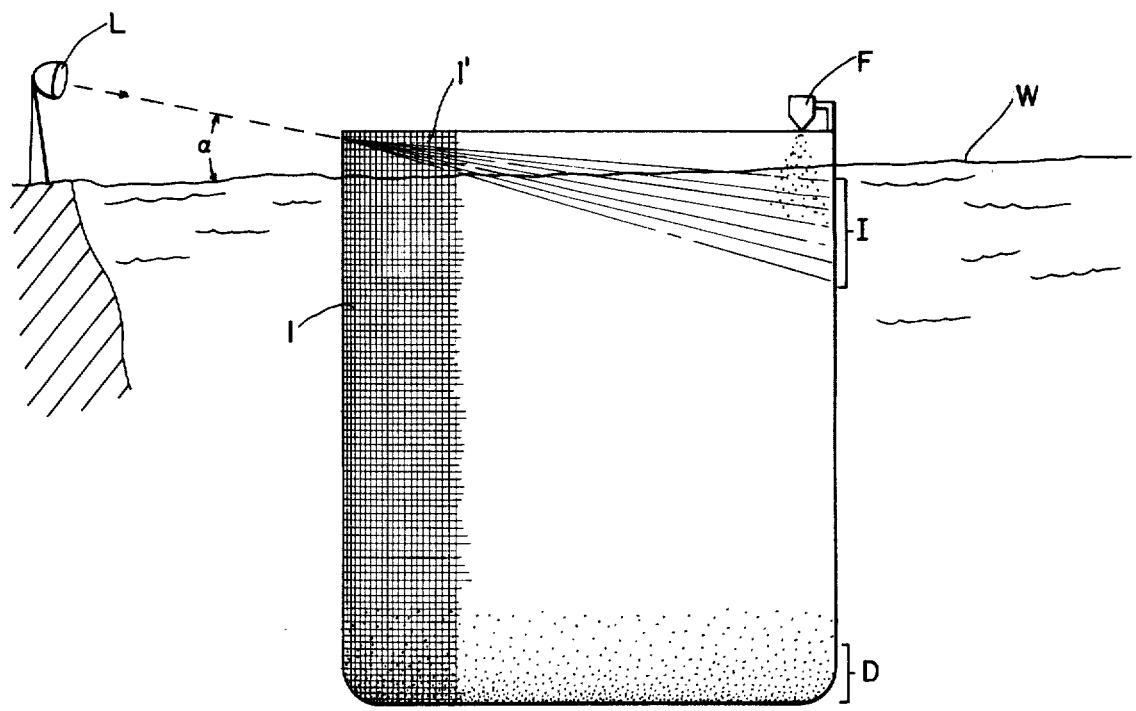

United States Patent [19]

Knowles

[11] 4,379,437
[45] Apr. 12, 1983

[54] PROCESS AND SYSTEM FOR ACCELERATED GROWTH OF SALMONIDS AND THE LIKE IN DEEP-WATER CAGES AND SIMILAR WATER VOLUMES

[75] Inventor: Albert H. Knowles, Concord, N.H.

[73] Assignees: Robert H. Rines; Carol M. Rines, both of Concord, N.H. ; part interest to each

[21] Appl. No.: 294,769

[22] Filed: Aug. 20, 1981

[51] Int. Cl.³ ............................................. A01K 61/00
[52] U.S. Cl. ........................................................ 119/3
[58] Field of Search .................................. 119/3, 2, 4, 5

[56] References Cited

U.S. PATENT DOCUMENTS

| | | | |
|---|---|---|---|
| 2,944,513 | 7/1960 | Keely | 119/3 |
| 3,572,291 | 3/1971 | Cavanagh | 119/3 |
| 3,698,359 | 10/1972 | Fremont | 119/3 |
| 3,726,251 | 4/1973 | Fremont | 119/3 |
| 4,287,852 | 9/1981 | Rines et al. | 119/3 |

*Primary Examiner*—Hugh R. Chamblee
*Attorney, Agent, or Firm*—Rines and Rines

[57] ABSTRACT

This disclosure is concerned with utilizing the lower dark strata of deep sea cages and the like for fish, such as salmon, as a stress-relief resting volume, while providing specially contoured artificial illumination beyond daylight hours that is limited to upper strata of the cages where feed is periodically applied, and which illumination is prevented from penetrating into the dark strata, but rather provides a predetermined upper laterally illuminated feed-exposing strata, viewable diffusely from below by the fish in the dark lower resting strata.

10 Claims, 2 Drawing Figures

PROCESS AND SYSTEM FOR ACCELERATED GROWTH OF SALMONIDS AND THE LIKE IN DEEP-WATER CAGES AND SIMILAR WATER VOLUMES

The present invention relates to processes and systems for growing fish, such as salmonids and the like, in relatively deep-water fish-holding volumes, such as sea-water cages or ponds or other predetermined volumes; being more particularly directed to modifying the environmental conditions to enable accelerated growth under such conditions.

In my earlier U.S. Pat. No. 4,271,788, issued June 9, 1981, it is disclosed that attempts have earlier been made to provide illumination of fish pools (sometimes also called ponds) beyond daylight hours to try to increase feeding; but that stress and related inhibiting conditions, even under tented or lidded pools, have limited the success of such techniques. When water-contacting opaque covers are used over substantial areas of the surface of such pools, however, to provide, unlike such tented or lid-covered pools, actual defined and delineated dark shadow volumes in which the fish may circulate in a non-competitive and rest condition, and view feed in adjacent external illuminated regions of the pool, even beyond daylight hours, extraordinary accelerated growth, absent disfigurement and early gonadic development, and with increased density benefits, can be produced. While this is particularly well-suited for relatively shallow volumes (such as, for example, freshwater pools or ponds up to a few feet or under a meter in depth in the case of salmon or trout fry and parr being raised to the smolt condition for sea-water maturation), such techniques are also useful in larger confined or predetermined volumes including sea cages or other relatively deep maturation ponds. Such sea cages, for example, may be 5 to 10 meters deep or more.

There are occasions, however, where weather conditions (such as high seas or wind conditions or other circumstances) may make the preferred floating or water-contacting opaque cover and extended feed illumination technique difficult or somewhat awkward. If, accordingly, a lesser accelerated growth is suitable and desired, without resort to such preferred operation and its other before-mentioned degree of benefits in fish condition, density, etc., the present invention provides for utilization of the darker condition at the lowest strata regions of such deep sea-water cages, for example, as a kind of darkened rest area. In the sea, particularly from before twilight to just before dawn, and in heavily overcast daylight conditions as well, the light intensity 5 to 10 meters below the water surface may be attenuated to the order of just a few lux. By using specially contoured and oriented near-surface artificial illumination beyond daylight hours (and/or during overcast days), provided in such a way as to maintain at least a substantial measure of a somewhat dark-region lower strata resting volume occupying a substantial lower cross-section of the cage, and a relatively sharply contrasted and delimited extended illumination strata there-above at which feed is introduced, a worthwhile measure of accelerated growth may be usefully obtained.

An object of the present invention, accordingly, is to provide a new and improved process and system for permitting accelerated growth in deep-water sea cages and the like beyond daylight hours and in overcast daylight conditions, wherein the depth of the cage is sufficient to provide during such overcast daylight and beyond daylight hours, relatively dark lower strata fo quiet cage bottom or near-bottom resting of the fish, by providing contoured artificial illumination along the surface and near-surface strata to define an upper predetermined laterally and preferably evenly illuminated feed region diffusely viewable from the lower dark resting strata and without interfering with the darkness thereof.

A further object is to provide a novel fish-growth process of more general utility, as well; wherein the term "fish" is herein used in its generic sense, apart from the illustrative examples to salmon and other salmonids, to embrace all types of water creatures having characteristics somewhat similar to those of the illustrated embodiments that can benefit from the technology of the invention.

Other and further objects will be explained hereinafter and are more particularly delineated in the appended claims. In summary, however, from one of its important viewpoints, the invention embraces a process for enabling accelerated feeding of fish beyond daylight hours and in overcast daylight in deep-water fish-holding volumes through which water circulates, that comprises, establishing a depth in said fish-holding volumes to provide sufficient daylight attentuation to produce substantially dark near-bottom lower strata in which fish may rest in continuous darkness; producing and directing artificial illumination across the near-surface strata of the water volume to define a predetermined lateral area of illumination in such upper strata without directing such artificial illumination into said dark lower strata; and periodically applying feed in such lateral area beyond daylight hours and in overcast daylight to permit fish resting in said dark lower strata to view the upper artificially illuminated feed diffusely in said upper illuminated strata and swim upward at will to obtain the same during the continued period of artificial illumination and feed application and then return downwardly back to the security of the dark lower strata. Preferred details and best mode embodiments are later presented.

Figure 2:
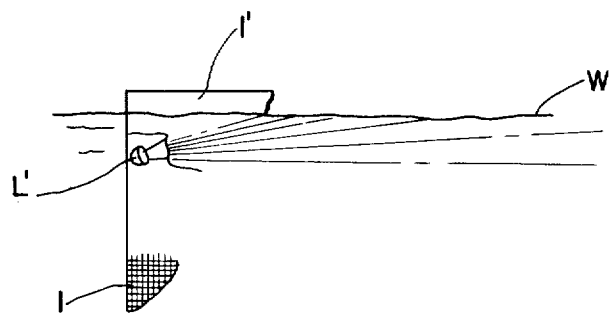

The invention will now be described with reference to the accompanying drawing,

FIG. 1 of which is a side elevation diagrammatically illustrating a preferred embodiment in connection with the exemplary example of a sea cage; and FIG. 2 is a fragmentary view of a modification.

Referring to FIG. 1, a deep sea-cage is illustrated floating in the sea W, with the fish-holding volume bounded or defined by a net 1 depending from a walkway 1' of, for example, rectangular configuration, as is well-known, with sea water circulating therethrough. For cages of, say, five to ten meters or more in depth, as before stated, daylight can be attenuated within such distances to provide relatively dark near-bottom strata D above the bottom bounding net for the resting purposes previously described. Artificial light (used for centuries in downward or random fashion by fishermen in the sea for the different purpose of attracting fish for netting), is rather critically located, directed and contoured, relative to the cage surface, to predetermine the upper strata that will be illuminated across the cage in order to establish a defined and delineated lateral area of illumination in such upper strata and to insure that such artificial illumination is not directed downwardly into the dark lower strata D. It is preferable that the source of illumination not be visible from below and that, to the contrary, the surface strata be laterally diffusely and rather evenly lighted so that feed can be periodically introduced throughout the illuminated transverse strata layers or at selected predetermined locations or regions thereof as by the conventional feeder(s) F, for upward diffuse and uniform vision and for access by the fish resting in the dark bottom strata D.

This result is shown effected, in the embodiment of FIG. 1, by locating a rather directional artificial light beam L (incandescent, fluorescent, etc. within a reflector, for example,) on shore to the side (left) of the floating cage 1-1' and positioning the same above the water level sufficiently that the artificial light is directed at an acute angle $\alpha$ to the water surface (preferably approaching grazing incidence) with directional contour such as to define the near-surface illuminated strata I to the center-to-right-hand surface area portion of the cage under the feeder location(s) F. By delineating the laterally illuminated near-surface transverse strata in such fashion, the light source is not visible from the dark bottom strata D and the upper strata I appear diffusedly and evenly laterally illuminated, in turn highlighting the feed introduced thereto. One light source L or an array may be used to service a plurality of cages (or ponds).

It has been found that at night, Atlantic salmon, as an illustration, go to the bottom of sea cages and, of course, do not feed in the darkness hours. Through a system substantially as shown in FIG. 1, with the illuminated layers I extending downward a shallow distance (from about a foot to a few feet, say 3 or so) and illuminated after daylight hours, the salmon come up from the bottom and feed periodically during the night, returning to their bottom dark rest strata D in between, thereby extending the feeding (if desired, over a 24-hour period) and accelerating growth.

Alternatively, carefully shaped, laterally inwardly (and/or upwardly) directed submerged light sources L' may be employed from a peripheral submerged region of the cage, as in FIG. 2, subject, however, to the same contouring and lateral directing, diffusing, and confirming restrictions discussed above.

Further modifications will occur to those skilled in this art; and such are considered to fall within the spirit and scope of the invention as defined in the appended claims.

What is claimed is:

1. A process for enabling accelerated feeding of fish beyond daylight hours and in overcast daylight in deepwater fish-holding volumes through which water circulates, that comprises, establishing a depth in said fish-holding volumes to provide sufficient daylight attenuation to produce substantially dark near-bottom lower strata in which fish may rest in continuous darkness; producing and directing artificial illumination across the near-surface strata of the water volume to define a predetermined delineated lateral area of illumination in such upper strata without directing such artificial illumination into said dark lower strata; and periodically applying feed in such lateral area beyond daylight hours and in overcast daylight to permit fish resting in said dark lower strata to view the upper artificially illuminated feed diffusely in said upper illuminated strata and swim upward at will to obtain the same during the continued period of artificial illumination and feed application and then return downwardly back to the security of the dark lower strata.

2. A process as claimed in claim 1 and in which said volumes are sea-cages and the like and said fish are salmonids and the like.

3. A process as claimed in claim 2 and in which the artificial illumination is directed laterally inward of the sea cage.

4. A process as claimed in claim 3 and in which the artificial illumination is directed laterally from a region to the side of the sea cage and elevated thereabove to illuminate the surface strata at an acute angle to the water surface.

5. A process as claimed in claim 3 and in which the artificial illumination is directed from a peripheral submerged region of the sea cage.

6. A process as claimed in claim 1 and in which the depth of the cage is adjusted sufficiently to reduce the daylight intensity at said dark lower strata to the order of a few lux.

7. A process as claimed in claim 1 and in which the depth of the layers of the artificially illuminated upper strata is limited to the order of from one to a few feet.

8. A system for accelerated fish growth having, in combination with a fish-holding volume through which water circulates and into which feed is applied at one or more predetermined locations, means for bounding the bottom strata of said volume at a water depth at which daylight from above the said volume is attenuated to the degree that said bottom strata are substantially dark; means for producing and directing artificial illumination after daylight hours, and if desired during overcast daylight conditions as well, across upper surface transverse strata of said volume including said predetermined feed application locations to provide a defined diffuse laterally illuminated near-surface feed area as viewed upwardly from said dark bottom strata, and without introducing artificial light into the dark bottom strata; and means for producing feed application at said predetermined locations beyond daylight hours and during the artificial illumination.

9. A system for accelerated fish growth having, in combination with a fish-holding volume through which water circulates and into which feed is applied at one or more predetermined locations means for bounding the bottom strata of said volume at a water depth at which daylight from above the said volume is attenuated to the degree that said bottom strata are substantially dark; means for producing and directing artificial illumination after daylight hours, and if desired during overcast daylight conditions as well, across upper surface transverse strata of said volume including said predetermined feed application locations to provide a defined diffuse laterally illuminated near-surface feed area as viewed upwardly from said dark bottom strata, and without introducing artificial light into the dark bottom strata; and means for providing feed application at said predetermined locations beyond daylight hours and during the artificial illumination and in which the said artificial illumination producing and directing means comprises directional light source means positioned to direct the light laterally inward within the periphery of the fish-holding volume with orientation to confine the same to the said upper transverse strata.

10. A process as claimed in claim 1 and in which the artificial illumination is directed, at least in part, upward to illuminate the near-surface strata.

* * * * *